United States Patent [19]
Newbigging

[11] Patent Number: 5,791,189
[45] Date of Patent: Aug. 11, 1998

[54] COMPOUND TRANSMISSION WITH REPEAT OR DOUBLE-I SHIFT PATTERN

[75] Inventor: Ian Mitchell Newbigging, Bolton, England

[73] Assignee: Eaton Corporation, Cleveland, Ohio

[21] Appl. No.: 736,038

[22] Filed: Oct. 21, 1996

[30] Foreign Application Priority Data

Oct. 21, 1995 [GB] United Kingdom ............... 9521620

[51] Int. Cl.[6] .................... F16H 59/10; F16H 59/12
[52] U.S. Cl. ............................. 74/335; 74/745
[58] Field of Search ................ 74/745, 335, 473 R

[56] References Cited

U.S. PATENT DOCUMENTS

| | | | |
|---|---|---|---|
| 4,561,325 | 12/1985 | Jester | 74/745 |
| 4,619,153 | 10/1986 | Lasoen | 74/745 |
| 4,633,725 | 1/1987 | Jones | 74/745 |
| 4,736,643 | 4/1988 | Richards | 74/339 |
| 4,754,665 | 7/1988 | Vandervoort | 74/745 |
| 4,788,875 | 12/1988 | Genise | 74/334 |
| 4,802,384 | 2/1989 | Schwarz et al. | 74/745 |
| 4,920,815 | 5/1990 | Reynolds | 74/335 |
| 4,966,048 | 10/1990 | Braun | 74/745 |
| 5,000,060 | 3/1991 | Reynolds et al. | 74/745 |
| 5,054,591 | 10/1991 | Braun | 192/3.63 |
| 5,062,313 | 11/1991 | Fletcher | 74/745 |
| 5,199,312 | 4/1993 | Huggins et al. | 74/335 |
| 5,315,900 | 5/1994 | Teeter | 477/165 |
| 5,385,066 | 1/1995 | Braun | 74/745 |
| 5,416,698 | 5/1995 | Hutchison | 74/335 |
| 5,511,437 | 4/1996 | Braun | 74/745 |

*Primary Examiner*—Charles A. Marmor
*Assistant Examiner*—Sherry Lynn Estremsky
*Attorney, Agent, or Firm*—Howard D. Gordon

[57] ABSTRACT

A compound change-gear transmission (10) and control therefor are provided. The manually shifted compound transmission comprises a three-speed input splitter section (12) connected in series with a mulitple-speed, lever-shifted main transmission section (14) connected in series with a two-speed output range section (16). The input splitter section is controlled by a mulitple-position splitter selector switch (85), and the range section is controlled by a range switch which may be a manually operated device for repeat-I-type shifting (FIG. 4) or may be an autorange-type switch (86) for double-I-type shifting patterns.

3 Claims, 3 Drawing Sheets

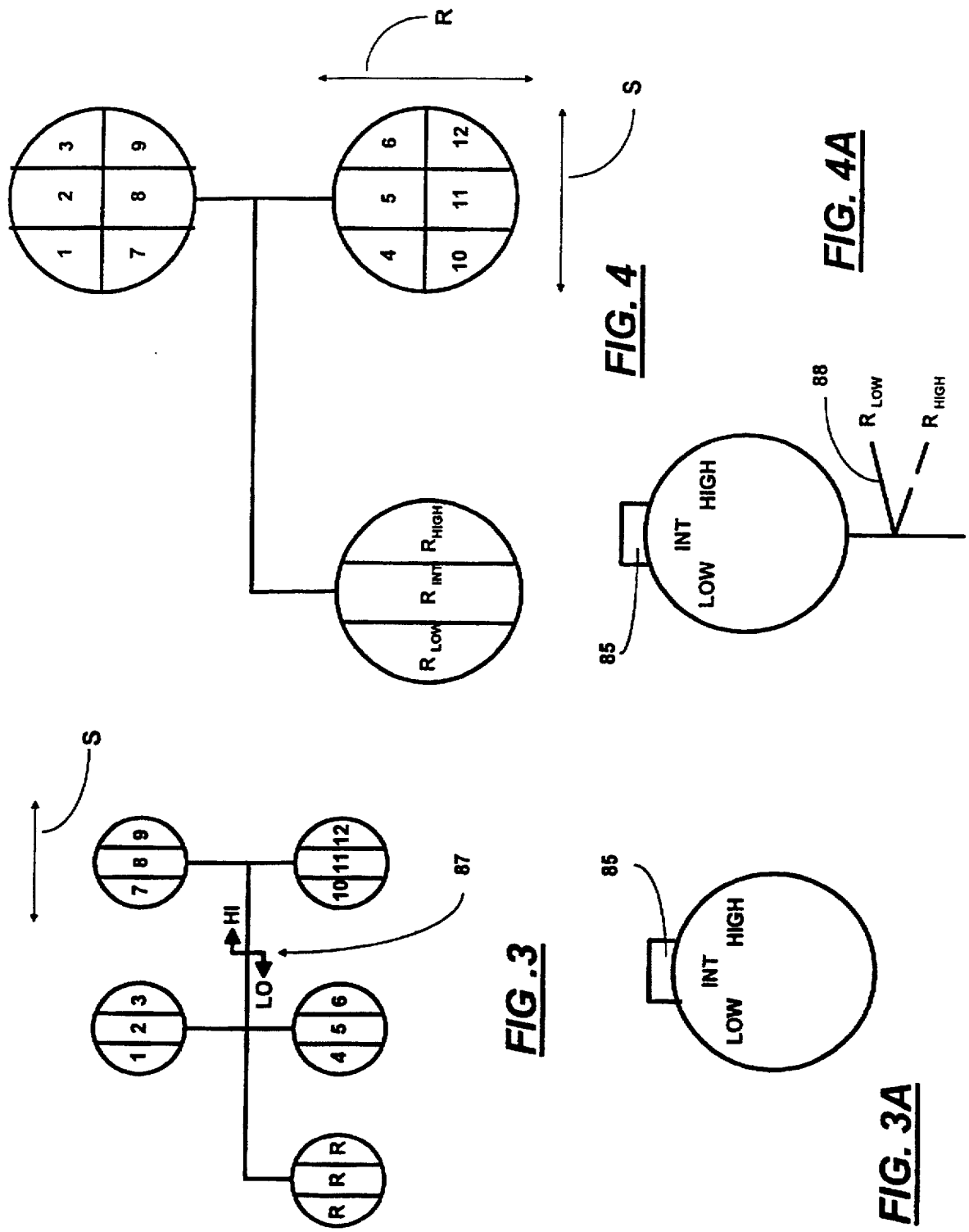

COMPOUND TRANSMISSION WITH REPEAT OR DOUBLE-I SHIFT PATTERN

BACKGROUND OF THE INVENTION

1. Field of the Invention

The present invention relates to a compound transmission having a relatively easily manipulated repeat or double-I-type shift pattern. In particular, the present invention relates to combined splitter-and-range-type compound transmissions, such as a "3×2×2" type compound transmission having a three-speed splitter input section, a two-forward-speed and one-reverse-speed main section, and a two-speed range output section, all connected in series. In the 3×2×2 embodiment, the splitter section is preferably controlled by a three-position splitter selector button, the main section is preferably controlled by a shift lever, and the range section may be controlled by a selector button for "repeat-I" type shifting or by an autorange-type switch for "double-I" type shifting.

2. Description of the Prior Art

Compound transmissions of the range type, splitter type and combined range-and-splitter type are well known in the prior art, as may be seen by reference to U.S. Pat. Nos. 4,754,665; 5,000,060; 5,272,939 and 5,390,561, the disclosures of which are incorporated by reference herein. Compound transmissions utilizing a subsplitter-type input section may be seen by reference to U.S. Pat. Nos. 4,966,048 and 5,054,591, the disclosures of which are incorporated by reference herein.

In compound transmissions of the synchronized type, especially when utilized in heavy-duty vehicles, it is known that at least some of the synchronized clutch assemblies will be of the "self-energizing" or "boosted" type, as disclosed in U.S. Pat. Nos. 5,065,855; 5,078,244; 5,078,245; 5,086,897; 5,092,439 and 5,111,922, the disclosures of which are incorporated by reference herein. Heavy-duty synchronized transmissions utilizing such synchronizers are manufactured and sold in Europe by Eaton Limited and Eaton S.A., wholly owned subsidiaries of the assignee of this application, under the trademark "S Series."

While many of the prior art transmissions are commercially and functionally successful, they are subject to improvement in the areas of reduced numbers of gears to provide a given number of selectable ratios and/or easier to utilize and/or less complicated controls.

SUMMARY OF THE INVENTION

In accordance with the present invention, an improved compound transmission, preferably an at least partially synchronized transmission, and transmission control are provided utilizing a minimal number of gears, or gear layers, to provide a given number of selectable ratios and providing an improved, easily operated control. The foregoing is accomplished by providing a transmission, preferably a wholly or partially synchronized transmission, having a multiple-speed splitter input section and a range-type output section. The splitter and range clutches are controlled by a first and second remote actuator assembly, respectively, such as one or more two- or three-position, pressurized, fluid-actuated pistons, while the main section is controlled by a shift bar or rod assembly of the types seen in U.S. Pat. Nos. 4,920,815 and 5,219,391, the disclosures of which are incorporated by reference herein. In the preferred embodiments, the first actuator assembly is controlled by a three-position selector typically located on the shift lever knob, while the second actuator assembly is automatically controlled by a range switch of the type associated with so-called "double-H" controls (see aforementioned U.S. Pat. No. 5,000,060).

Accordingly, it is an object of the present invention to provide a new and improved compound transmission and controls therefor.

This and other objects and advantages of the present invention will become apparent from a reading of the detailed description of the preferred embodiment taken in connection with the drawings.

BRIEF DESCRIPTION OF THE DRAWINGS

FIG. 3 is a schematic illustration of a "repeat-I" type shift pattern for the transmission of FIG. 1

FIG. 3A is a schematic illustration of the shift lever knob used in connection with the shift pattern of FIG. 3.

FIG. 4 is a schematic illustration of a "double-I" type shift pattern for the transmission of FIG. 1.

FIG. 4A is a schematic illustration of the shift lever and shift lever knob used in connection with the shift pattern of FIG. 4.

DESCRIPTION OF THE PREFERRED EMBODIMENT

Figure 1:
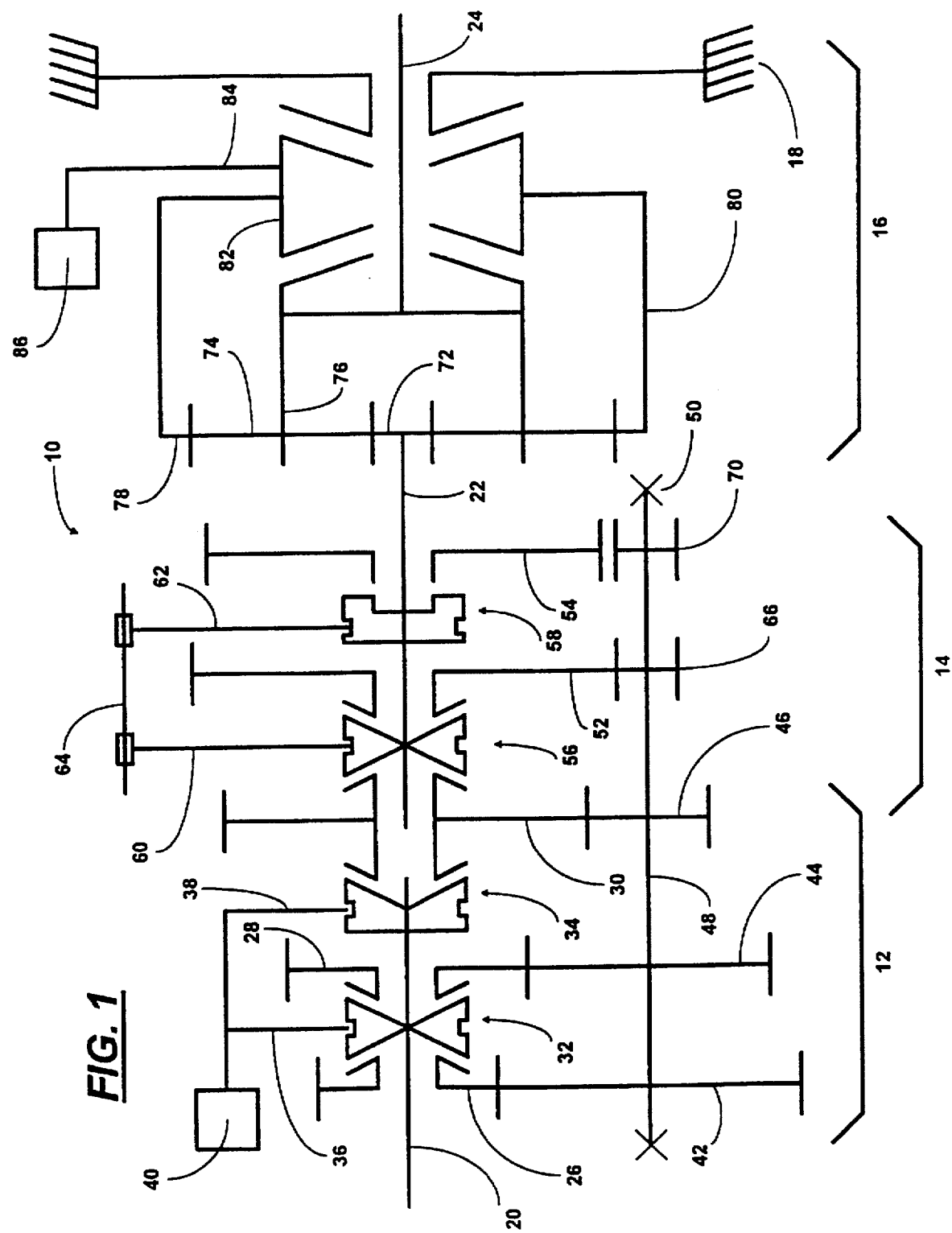
FIG. 1 is a schematic illustration of the compound transmission of the present invention.

Certain terminology will be used in the following description for convenience in reference only and is not intended to be limiting. The terms "upwardly," "downwardly," "rightwardly" and "leftwardly" designate directions in the drawings to which reference is made. The words "inwardly" and "outwardly" will refer, respectively, to directions toward and away from the geometric center of a device and designated parts thereof. The foregoing applies to the words specifically mentioned, derivatives thereof and words of similar import.

The term "compound transmission" is used to designate a change-speed or change-gear transmission having a main transmission section and one or more auxiliary transmission sections connected in series whereby the selected gear reduction in the main transmission section may be compounded by further selected gear reduction in the auxiliary transmission section(s).

"Synchronized clutch assembly" and words of similar import shall designate a clutch assembly utilized to non-rotatably couple a selected gear to a shaft by means of a positive clutch in which attempted engagement of such clutch is prevented or blocked until the members of the clutch are at substantial synchronous rotation and a relatively large capacity friction means is associated with the clutch members and are sufficient, upon initiation of a clutch engagement, to cause the clutch members and all members rotating therewith to rotate at a substantially synchronous speed.

Figure 2:
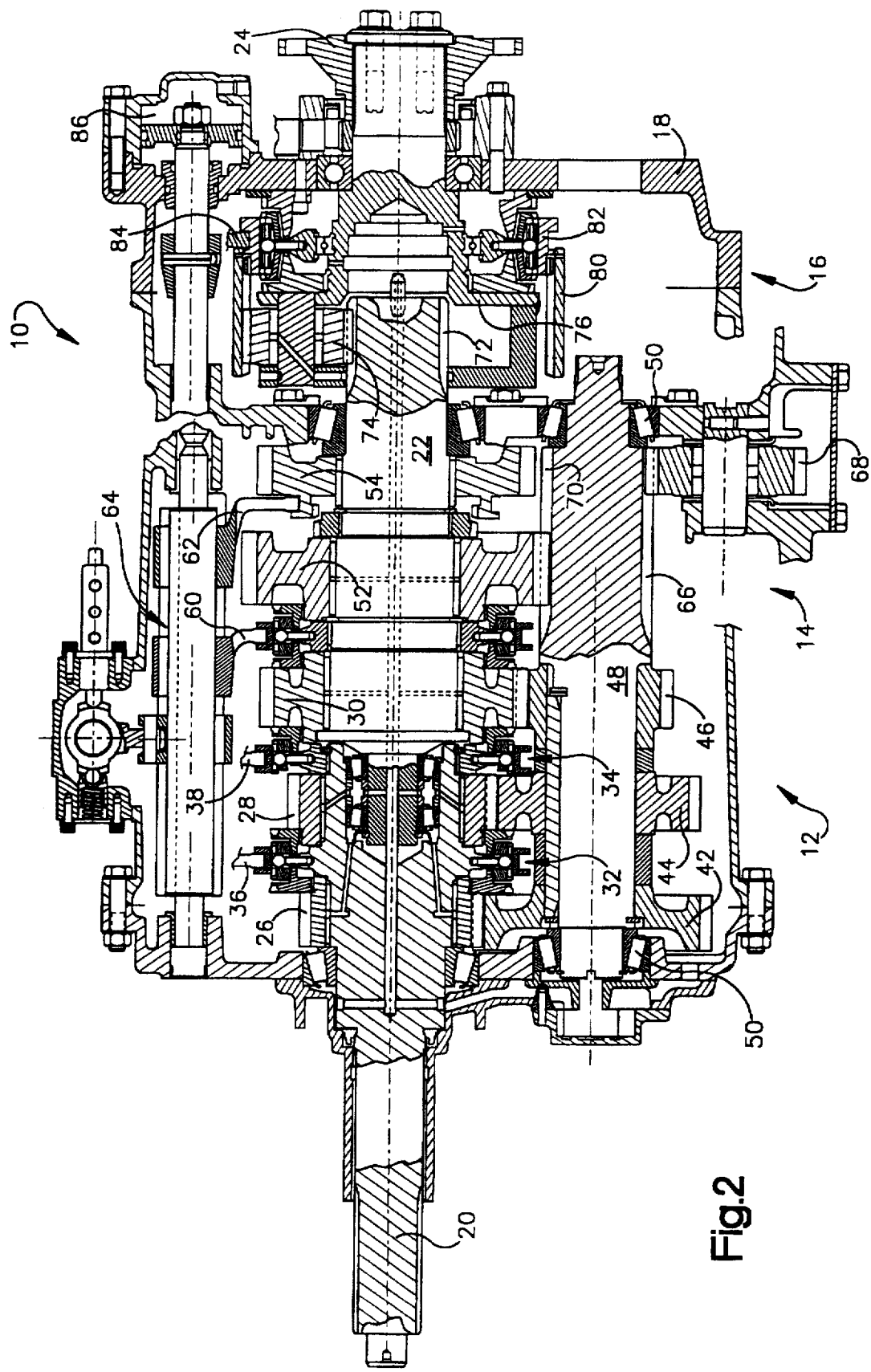
FIG. 2 is a sectional view of the transmission of FIG. 1.

FIG. 1 schematically illustrates, and FIG. 2 structurally illustrates, a single-countershaft-type, synchronized, 3×2×2-type, 12-speed compound transmission 10 comprising a 3-speed input splitter section 12, a two-forward, one-reverse-speed main section 14, and planetary-type, two-speed range output section 16. Sections 12, 14 and 16 are connected in series in a housing 18.

Although transmission 10 is illustrated as a single countershaft, fully synchronized transmission, the present invention is equally applicable to multiple identical countershaft and/or non-synchronized type transmissions.

The transmission 10 includes an input shaft 20 driven by a prime mover (such as a well-known diesel engine) through a non-positive coupling (such as a torque converter or a selectively engaged and disengaged master friction clutch), a main shaft 22 generally coaxial with the input shaft 20, and an output shaft 24 generally coaxial with the main shaft 22. Main shaft 24 is typically connected to a vehicular drive axle or transfer case, as is well known in the prior art.

In the splitter-type input section 12, gears 26, 28 and 30 are coaxial with and clutchable to the input shaft 20 by means of synchronized, double-acting clutch mechanism 32 or single-acting, synchronized clutch mechanism 34. Clutches 32 and 34, respectively, are axially positioned by means of shift forks 36 and 38, respectively, which are controlled by the splitter actuator mechanism 40. Mechanism 40 is effective to cause engagement of a selected one, and only one, of gears 26, 28 or 30 to the input shaft 20 at any time. Splitter input gears 26, 28 and 30, respectively, are constantly engaged with countershaft gears 42, 44 and 46, respectively, carried by a countershaft 48 supported by bearings 50 in the housing 18.

In the main transmission section 14, forward drive gears 30 and 52 and reverse gear 54 are selectively, drivingly engageable to the main shaft 22 by means of double-acting, synchronized clutch assembly 56 or single-acting clutch assembly 58. Clutches 56 and 58, respectively, are axially positioned by means of shift forks 60 and 62, respectively, which in turn are controlled by an operator-manipulated shift bar housing assembly or single shift shaft assembly 64. Shift bar housing assemblies and single shift shaft assemblies are known in the prior art and examples thereof may be seen by reference to U.S. Pat. Nos. 4,920,815 and 5,219,391, the disclosures of which are incorporated herein by reference. Typically, the shift assemblies 64 will have an interlock mechanism for preventing engagement of more than one of the gears 30, 52 or 54 to the main shaft at a time.

Main shaft gear 52 is constantly meshed with countershaft gear 66 fixed to countershaft 48, while reverse gear 54 is constantly meshed with a reverse idler 68, which in turn is constantly meshed with countershaft gear 70. The rearward end of main shaft 22 extends into the output range-type auxiliary section 16 and carries a sun gear 72 fixed thereto. Sun gear 72 is constantly meshed with a plurality of planet gears 74 carried by a planet carrier 76, which is fixed for rotation with the output shaft 24. Planet gears 74 are also constantly meshed with ring gear 78 to define a known planetary-gearing-type structure. Ring gear 78 is carried by a ring gear shroud 80, which in turn carries a double-acting, synchronized range clutch mechanism 82 for selectively clutching the ring gear 78 to either the planet carrier 76 to provide a direct drive relationship between main shaft 22 and output shaft 24, or to the housing 18 whereby the output shaft 24 will be driven at a speed reduction relative to the main shaft 22. Double-acting clutch mechanism 82 is axially positioned by a shift fork 84 controlled by a range actuator mechanism 86.

The splitter actuator 40 is effective to provide three selectable splitter ratios, low, intermediate or high, by selectively coupling gears 26, 28 or 30, respectively, to the input shaft 20. When clutch 32 is moved rightwardly, the countershaft 48 is driven from the input shaft 20 through gears 26 and 42. When clutch member 32 is moved rightwardly, countershaft 48 is driven from the input shaft 20 through gears 28 and 44. When clutch member 34 is moved rightwardly, countershaft 48 is driven from input shaft 20 through gears 30 and 46. Preferably, the splitter actuator 40 is controlled by a three-position switch or button 85, usually located on the operator's shift lever, whereby the operator may select a low, intermediate or high input splitter ratio, see FIG. 3A.

In the main section 14 of transmission 10, the clutch member 56 may be moved leftwardly to engage the main shaft 22 with gear 30, or may be moved rightwardly to engage the gear 52 with the main shaft 20. The reverse clutch member 58 may be moved rightwardly to engage the reverse gear 54 with the main shaft 22. Clutches 56 and 58, as indicated above, are positioned by shift forks 60 and 62, respectively, which are controlled by an operator-manipulated shift bar housing or shift shaft assembly 64.

In the auxiliary section 16, the main shaft 22 drives the sun gear 72, which is meshed with the planet gears 74, which in turn are meshed with the ring gear 78. With the clutch mechanism 82 moved leftwardly, the ring gear 80 and the planet carrier 76 are locked together, thereby locking up the planetary gear mechanism and causing the output shaft 24 to rotate with main shaft 22. When the clutch mechanism 84 is moved rightwardly, the ring gear 78 is grounded to the housing 18, causing a planetary reduction between the main shaft 22 and the output shaft 24, as is well known in the prior art. The range clutch member 82 is controlled by a shift fork 84 operated by a range mechanism 86. The range actuator mechanism 86 may be controlled by a double-H-type autorange switch member 87, which will result in the repeat-I shift pattern illustrated in FIG. 3, or the transmission 10 may be provided with a separate operator-actuated range button 88 (see FIG. 4B), which will result in a repeat-I-type shift pattern, as is illustrated in FIG. 4. Transmission controls using splitter selector buttons 85 and/or range selector buttons 88 are well known in the prior art. The structure and function of the double-acting, synchronized jaw clutch members are also well known in the prior art, as may be seen by reference to U.S. Pat. Nos. 4,462,489; 4,125,179 and 5,111,922, the disclosures of which are incorporated herein by reference. The splitter operating mechanism 40 and the range operating mechanism 60 are preferably two- or three-position piston assemblies, examples of which may be seen by reference to U.S. Pat. No. 5,054,591, the disclosure of which is incorporated herein by reference.

According to the present invention, it may be seen that a 12-forward-speed, three-reverse-speed transmission is provided, which utilizes a minimal number of gears and provides a relatively simple and easily executed shifting procedure for the vehicle operator.

Although the present invention has been described with a certain degree of particularity, it is understood that various modifications are possible without departing from the spirit and the scope of the invention as hereinafter claimed.

I claim:

1. A manually shifted, 12-forward-speed compound transmission comprising a three-speed input splitter section connected in series with a two-forward-speed, one-reverse-speed main transmission section connected in series with a two-speed range output section, said splitter input section comprising a splitter clutch assembly controlled by a splitter actuator for engaging a selected one of said three splitter ratios, said range section comprising a range clutch assembly for selectively engaging one of said two range section ratios, and said main section comprising a main section clutch assembly for selectively engaging a selected one of said two forward speed main section ratios or one reverse speed main section ratio;

said main section clutch assembly controlled by a manually operated shift lever;

a manually operated, three-position splitter switch for operating said splitter actuator, each of said three positions corresponding to a unique engagement position of said splitter clutch assembly; and a range switch for controlling said range clutch assembly.

2. The transmission of claim 1 wherein said range switch is responsive to movements of said shift lever to automatically control said range actuator.

3. The transmission of claim 1 wherein said range switch comprises a manually operated switching device.

* * * * *